(12) United States Patent
Chamaret et al.

(10) Patent No.: US 9,743,062 B2
(45) Date of Patent: Aug. 22, 2017

(54) METHOD AND DEVICE FOR RETARGETING A 3D CONTENT

(75) Inventors: Christel Chamaret, Chantepie (FR); Fabrice Urban, Thorigne Fouillard (FR); Thai Quan Huynh-Thu, Rennes (FR); Jean-Claude Chevet, Betton (FR)

(73) Assignee: THOMPSON LICENSING SA, Issy les Moulineaux (FR)

( * ) Notice: Subject to any disclaimer, the term of this patent is extended or adjusted under 35 U.S.C. 154(b) by 448 days.

(21) Appl. No.: 14/123,213

(22) PCT Filed: May 23, 2012

(86) PCT No.: PCT/EP2012/059535
§ 371 (c)(1),
(2), (4) Date: Apr. 2, 2014

(87) PCT Pub. No.: WO2012/163743
PCT Pub. Date: Dec. 6, 2012

(65) Prior Publication Data
US 2014/0232821 A1  Aug. 21, 2014

(30) Foreign Application Priority Data
May 31, 2011  (EP) ..................... 11305661

(51) Int. Cl.
*H04N 13/00*  (2006.01)
*G06T 3/00*  (2006.01)

(52) U.S. Cl.
CPC ....... *H04N 13/0018* (2013.01); *G06T 3/0012* (2013.01); *H04N 13/0029* (2013.01); *G06T 2207/20132* (2013.01)

(58) Field of Classification Search
CPC .... H04N 13/0018; H04N 13/00; H04N 7/173; H04N 13/0014; H04N 13/0059;
(Continued)

(56) References Cited

U.S. PATENT DOCUMENTS 7,113,632 B2   9/2006  Lee et al.
8,619,082 B1 *  12/2013  Ciurea ............... H04N 13/0022
                                              345/427
(Continued)

FOREIGN PATENT DOCUMENTS

CN   101040536   9/2007
CN   100478991   4/2009
(Continued)

OTHER PUBLICATIONS

Utsugi et al "Seam carving for stereo images", 3DTV-Conference: The True Vision—Capture, Transmission and Display of 3D Video (3DTV-CON), 2010, IEEE, Piscataway, NJ, USA, Jun. 7, 2010 (Jun. 7, 2010), pp. 1-4, XP031706344, ISBN: 978-1-4244-6377-0.*
(Continued)

*Primary Examiner* — Frank Huang
(74) *Attorney, Agent, or Firm* — Tutunjian & Bitetto, P.C.

(57) ABSTRACT

A method of cropping a 3D content comprising at least a first view and a second view is disclosed that comprises:
determining a first saliency map from the first view and a second saliency map from the second view;
determining a final cropping window from the first and second saliency maps; and
cropping the first view and the second view according to the final cropping window.

13 Claims, 5 Drawing Sheets

(58) Field of Classification Search
CPC ......... H04N 21/21805; H04N 21/2343; H04N 21/2365; H04N 21/6547; H04N 21/6587; H04N 21/816; H04N 13/0242; H04N 21/6125; G06T 7/0075; G06T 5/001; G06T 2207/20028; G06K 9/00
See application file for complete search history.

(56) References Cited

U.S. PATENT DOCUMENTS

| | | | |
|---|---|---|---|
| 2007/0025643 | A1 | 2/2007 | Le Meur et al. |
| 2007/0116361 | A1 | 5/2007 | Le Meur et al. |
| 2008/0094502 | A1 | 4/2008 | Liebhold |
| 2009/0022393 | A1* | 1/2009 | Bar-Zohar ............ G06T 7/0075 382/154 |
| 2009/0207179 | A1 | 8/2009 | Huang et al. |
| 2009/0244093 | A1 | 10/2009 | Chen et al. |
| 2009/0251594 | A1 | 10/2009 | Hua et al. |
| 2010/0259595 | A1* | 10/2010 | Trimeche ........... H04N 13/0014 348/43 |
| 2011/0038529 | A1 | 2/2011 | Utsugi et al. |
| 2012/0321172 | A1* | 12/2012 | Jachalsky ............ G06T 7/0075 382/154 |
| 2013/0272582 | A1* | 10/2013 | Schlosser ........... H04N 13/0022 382/107 |

FOREIGN PATENT DOCUMENTS

| | | |
|---|---|---|
| CN | 101535941 | 9/2009 |
| CN | 102075694 | 5/2011 |
| EP | 1764736 | 3/2007 |
| EP | 1695288 | 5/2007 |
| EP | 1956550 | 8/2008 |
| EP | 2323416 | 5/2011 |
| JP | 2005072674 | 3/2005 |
| JP | 200735038 | 2/2007 |
| JP | 2007189489 | 7/2007 |
| JP | 2009212929 | 9/2009 |
| TW | 200937344 | 9/2009 |
| WO | WO2009/132896 | 11/2009 |
| WO | WO2012/175386 | 12/2012 |

OTHER PUBLICATIONS

Avidan, S. et al., "Seam Carving for Content-Aware Image Resizing", ACM Transactions on Graphics, vol. 26, No. 3, Article 10, Jul. 2007, pp. 1-9.
Barnes, C. et al., "PatchMatch: A Randomized Correspondence Algorithm for Structural Image Editing", ACM Transactions on Graphics (Proc. SIGGRAPH), Aug. 2009. (10 pages).
Basha, T. et al., "Geometically Consistent Stereo Seam Carving", IEEE International Conference on Computer Vision, 2011, pp. 1816-1823.
Castillo, S. et al., "Using Eye-Tracking to Assess Different Image Retargeting Methods", APGV, Aug. 2011, pp. 7-14.
Chamaret, C. et al., "How to measure the relevance of a retargeting approach?", Trends and Topics in Computer Vision, Lecture Notes in Computer Science, vol. 6554, 2012, pp. 156-168.
De Bruijn, O. et al., "Rapid Serial Visual Presentation: A space-time trade-off in information presentation", AVI '00 Proceedings of the working conference on Advanced visual interfaces, 2000, pp. 189-192.
Devernay, F. et al., "New View Synthesis for Stereo Cinema by Hybrid Disparity Remapping", Proceedings of the the 2010 IEEE 17th International Conference on Image Processing, Sep. 2010, pp. 5-8.
Huynh-Thu, Q. et al., "Examination of 3D visual attention in stereoscopic video content", Proc. SPIE 7865, Human Vision and Electronic Imaging XVI, Feb. 2011. (15 pages).
Itti, L. et al., "A model of Saliency-Based Visual Attention for Rapid Scene Analysis", IEEE Transactions on Pattern Analysis and Machine Intelligence, vol. 20, No. 11, Nov. 1998, pp. 1254-1259.
Le Muer, O. et al., "Predicting visual fixations on video based on low-level visual features", Vision Research 47 (2007), pp. 2483-2498.
Liu, F. et al., "Automatic Image Retargeting with Fisheye-View Warping", Proceedings of the 18th annual ACM symposium on User interface software and technology, 2005, pp. 153-162.
Munoz, A. et al., "Least-squares Image Resizing Using Finite Differences", IEEE Transactions on Image Processing, vol. 10, No. 9, Sep. 2001, pp. 1365-1378.
Rubinstein, M. et al., "Multi-operator Media Retargeting", SIGGRAPH '09, Aug. 2009. (11 pages).
Santella, A. et al., "Gaze-Based Interaction fro Semi-automatic Photo Cropping", CHI 2006, Apr. 2006. (10 pages).
Seltur, V. et al., "Automatic Image Retargeting", MUM '05 Proceedings of the 4th international conference on Mobile and ubiquitous multimedia, 2005, pp. 59-68.
Suh, B. et al., "Automatic Thumbnail Cropping and its Effectiveness", UIST '03 Proceedings of the 16th annual ACM symposium on User interface software and technology, 2003, pp. 95-104.
Toony, Z. et al., "A Modified Saliency Detection for Content-Aware Image Resizing Using Cellular Automata", Signal and Image Processing (ICSIP), 2010 International Conference on, Dec. 2010, pp. 175-179.
Urban, F. et al., "Medium Spatial Frequencies, a Strong Predictor of Salience", Cogn. Comput. (2011) 3:37-47.
Utsugi, K. et al., "Seam Carving for Stereo Images", 3DTV-Conference: The True Vision—Capture, Transmission and Display of 3D Video (3DTV-CON), Jun. 2010. (4 pages).
Yang, B. et al., "Salient Region of Textured 3D Model", 18th Pacific Conference on Computer Graphics and Applications, 2010. pp. 78-84.
Kei Etal: "Seam carving for stereo images", 3DTV-conference: the true vision—capture, transmission and display of 3D video (3DTV-CON), 2010, IEEE, Piscataway, NJ, USA, Jun. 7, 2010, pp. 1-4, XP031706344, ISBN: 978-1-4244-6377-0, the whole document.
Vaquero et al: "A survey of image retargeting techniques", Proceedings of SPIE, The International society for optical engineering SPIE, USA, vol. 7798. Aug. 2, 2010, pp. 779814-1, XP002646537, ISSN: 0277-786X, DOI: 101117/12.862419, the whole document.
Chamaret etal: "video retargeting for stereoscopic content under 3D viewing constraints". Proceedings of SPIE. SPIE, US, vol. 8288, Feb. 6, 2012, pp. 82880H-1, XP009162431, ISSN: 0277-786X, the whole document.
Weijer etal: Learning Color Names for Real World Applications IEEE Transactions on Image Processing, Mar. 4, 2009.
Welch etal: An introduction to the Kalman filter. SIGGRAPH 2001, Los Angeles, CA, Aug. 12-17, 2001.
Search Report Dated Sep. 19, 2012.

* cited by examiner

METHOD AND DEVICE FOR RETARGETING A 3D CONTENT

This application claims the benefit, under 35 U.S.C. §365 of International Application PCT/EP2012/059535, filed May 23, 2012, which was published in accordance with PCT Article 21(2) on Dec. 6, 2012 in English and which claims the benefit of European patent application No. 11305661.8, filed May 31, 2011.

1. FIELD OF THE INVENTION

The invention relates to 3D content retargeting. More particularly, it concerns a method of cropping a 3D content comprising at least a first view and a second view.

2. BACKGROUND OF THE INVENTION

Due to the proliferation of 3D screen and materials, such as 3D movie at the theater, there is a need for aspect ratio conversion in order to allow the transfer of 3D streams from the cinema aspect ratio (2:35) to TV screen (16:9). Moreover, one can imagine the imminent emergence of new devices such as tablets, smartphones supporting 3D stereoscopic display. Such devices will bring their own aspect ratio. Aspect ratio conversion is thus mandatory to address any devices. An automatic solution is of high value maximizing the visual comfort.
Currently, the aspect ratio conversion is addressed either manually by an operator (e.g. centered cropping) or by processing all frames in the same way (e.g. anamorphism operator, black stripes filling). Both types of methods do not take into account the content itself for performing the conversion.
Moreover, black stripes addition strongly reduces the original 3D effect compared to having the movie displayed in full screen.

3. BRIEF SUMMARY OF THE INVENTION

The invention is aimed at alleviating at least one of the drawbacks of the prior art. The invention relates to a method of cropping a 3D content comprising at least a first view and a second view comprising the steps of:
  determining a first saliency map from the first view and a second saliency map from the second view;
  determining a final cropping window from the first and second saliency maps; and
  cropping the first view and the second view according to the final cropping window.
According to a first embodiment, the step of determining the final cropping window from the first and second saliency maps comprises the steps of:
  determining a first cropping window from the first saliency map;
  determining a second cropping window from the second saliency map; and
  combining the first and second cropping windows into the final cropping window.
According to a second embodiment, the final cropping window being identified by parameters, the method further comprises the steps of:
  filtering over time the parameters of the final cropping window;
  determining a forbidden area map indicating regions where final cropping window borders is to be avoided; and converting the aspect ratio of the final cropping window into a target aspect ratio using the forbidden area map.
According to a variant of the second embodiment, the final cropping window being identified by parameters, the method further comprises the steps of:
  filtering over time the parameters of the final cropping window;
  determining a forbidden area map indicating regions where final cropping window borders is to be avoided; and
  converting the aspect ratio of the final cropping window into a target aspect ratio using the forbidden area map and a depth map.
Advantageously, the step of determining the forbidden area map comprises the steps of:
  segmenting one of the at least two views into a segmentation map of regions;
  computing, for each region of the segmentation map, a saliency value from the saliency map of the one of the at least two views;
  thresholding the saliency values computed for each region to form a forbidden area map.
According to a third embodiment, the step of determining a final cropping window from the first and second saliency maps comprises the steps of:
  combining the first and second saliency maps into a single saliency map; and
  determining the final cropping window based on the single saliency map.

4. BRIEF DESCRIPTION OF THE DRAWINGS

Other features and advantages of the invention will appear with the following description of some of its embodiments, this description being made in connection with the drawings in which.

5. DETAILED DESCRIPTION OF THE INVENTION

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

The invention may be realized on any electronic device comprising retargeting means. For instance, the invention may be realized in a television, a mobile videophone, a PDA, a personal computer, a digital video camera, a navigation system or a car video system.

The invention relates to a method for retargeting 3D content. Three embodiments are disclosed herein. The two first embodiments are an extension of a 2D retargeting method. New steps are added to ensure acceptable 3D quality. The third embodiment is a retargeting method dedicated to 3D content. The 3D content is made of a left view and a right view. But the invention can be extended to more than two views. In the following a cropping window is identified by its parameters which are either the coordinates of its top left and bottom right pixels or the coordinates of its center and its height and width.

All embodiments are cropping-based, i.e. a sub-area of pixels of the original views with the most important content, also named regions of interest, are extracted. Moreover, the final cropping window is identical for the left and right views even if the determination of this final cropping window is based on content of each view.

Some embodiments refer to a visual attention model. This visual attention model provides a saliency map (grey level map) which indicates which area/pixels are the most visually attractive in the view. Such saliency maps may be used for determining regions of interest in a picture. An example of such a visual attention model is disclosed in EP patent application 04804828.4 published on 30 Jun. 2005 under number 1695288. Other visual attention models that provide a saliency map can be used. The invention is not at all limited to the model disclosed in EP patent application 04804828.4.

Figure 1A:
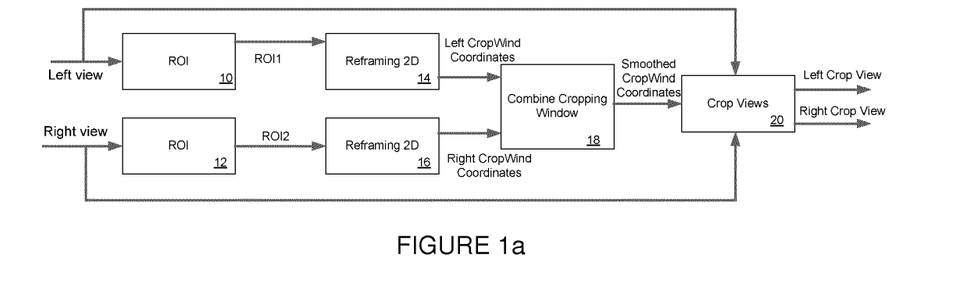
FIG. 1a depicts a flowchart of the method according to a first embodiment of the invention.

FIG. 1a represents a method of retargeting a 3D content comprising left and right views according to the first embodiment. It comprises applying regular 2D reframing on each view independently in order to get one cropping window in each view and then in combining all the cropping window by taking into account some constraints related to 3D content in order to get a final cropping window that is to be applied on each view.

To this aim, at step 10, a first region of interest ROI1 is determined in the left view and at step 12 a second region of interest ROI2 is determined in the right view.

At step 14, a left cropping window is determined from the first region of interest ROI1 and a right cropping window ROI2 is determined from the second region of interest. The left cropping window is for example the smallest window that encompasses the first region of interest and the right cropping window is the smallest window that encompasses the second region of interest.

At step 18, the left and right cropping windows are combined in a smoothed cropping window. During this step, the following constraint linked to 3D content is taken into account: no vertical disparity is allowed between left and right cropped views; the cropping windows of each view have the same height and the same vertical coordinates.

The CombineCroppingWindow step 18 takes the results for the 2D reframing applied on each view separately at steps 14 and 16 and combines mathematically the two cropping windows into a smoothed cropping window whose center coordinates are $(x_{smooth}, y_{smooth})$ and size (height and width) is $(h_{smooth}, w_{smooth})$. $(x_{left}, y_{left})$ are the center coordinates of the left cropping window and $(x_{right}, y_{right})$ are the center coordinates of the right cropping window. $(h_{left}, w_{left})$ are the height and width of the left cropping window and $(h_{right}, W_{right})$ are the height and width of the right cropping window.

$$y_{smooth} = \frac{y_{left} + y_{right}}{2} \quad x_{smooth} = \frac{x_{left} + x_{right}}{2}$$

$$h_{smooth} = \frac{h_{left} + h_{right}}{2} \text{ and } w_{smooth} = \frac{w_{left} + w_{right}}{2}.$$

According to a variant, the min and max value is taken as in equation 8. The same cropping window is applied on both views. Therefore, no vertical disparity exists between left and right crop views.

Another way for determining the smoothed cropping window is to determine which cropping window maximizes the saliency quantity available inside it. The cropping window coordinates vary from the minimal x and y coordinates initially determined between the two views and the maximal x and y coordinates, such as described in the following equation:

$$(x1, y1, x2, y2) = \operatorname{argmax}\left[\sum_{X=x1}^{x2}\sum_{Y=y1}^{y2} 0.5 * (SM_{left}(X,Y) + SM_{right}(X,Y))\right] \quad (1)$$

with $x1_{min} < x1 < x1_{max}$; $y1_{min} < y1 < y1_{max}$;
$x2_{min} < x2 < x2_{max}$; $y2_{min} < y2 < y2_{max}$ and $$\begin{cases} x1_{min} = \min(x1_{left}, x1_{right}); x1_{max} = \max(x1_{left}, x1_{right}) \\ x2_{min} = \min(x2_{left}, x2_{right}); x2_{max} = \max(x2_{left}, x2_{right}) \\ y1_{min} = \min(y1_{left}, y1_{right}); y1_{max} = \max(y1_{left}, y1_{right}) \\ y2_{min} = \min(y2_{left}, y2_{right}); y2_{max} = \max(y2_{left}, y2_{right}) \end{cases}$$

$SM_{left}(x,y)$ is the saliency value of pixel (x,y) in the left view and $SM_{right}(x,y)$ is the saliency value of pixel (x,y) in the left view. (x1,y1) are the coordinates of the top left pixel of the smooth cropping window and (x2, y2) are the coordinates of the bottom right pixel of the smooth cropping window. $(x1_{left}, y1_{left})$ are the coordinates of the top left pixel of the left cropping window and $(x2_{left}, y2_{left})$ are the coordinates of the bottom right pixel of the left cropping window. $(x1_{right}, y1_{right})$ are the coordinates of the top left pixel of the right cropping window and $(x2_{right}, y2_{left})$ are the coordinates of the bottom right pixel of the left cropping window.

At step 20, both left and right views are cropped into a left crop view and a right crop view by extracting in each view the part delimited by the smoothed cropping window.

The first embodiment is simple and fast to implement.

Figure 1B:
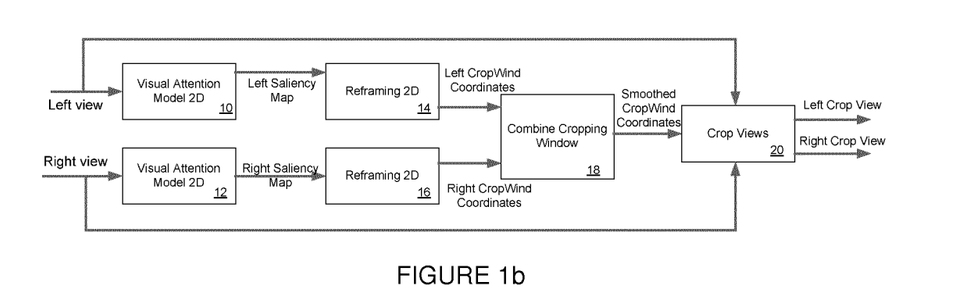
FIG. 1b depicts a flowchart of the method according to variant of the first embodiment of the invention.

FIG. 1*b* represents a method of retargeting a 3D content comprising left and right views according to specific implementation of the first embodiment. It comprises applying regular 2D reframing on each view independently in order to get one cropping window in each view and then in combining all the cropping window by taking into account some constraints related to 3D content in order to get a final cropping window that is to be applied on each view. In this specific implementation the first and second regions of interest are determined using saliency maps.

To this aim, at step 10, a left saliency map is determined for the left view and at step 12 a right saliency map is determined for the right view. Both saliency maps are for example determined using the model of EP patent application 04804828.4. A saliency map thus indicates the salient regions in a picture.

At step 14, a left cropping window is determined based on the left saliency map and at step 16 a right cropping window is determined based on the right saliency map. The position of each cropping window is identified in the corresponding view by its CropWind coordinates. The cropping windows are determined for example using one of the reframing method disclosed in EP application 05291938.8 published on 21 Mar. 2007 under number 1764736. As an example, the most salient pixel is identified in the saliency map, i.e. whose saliency value within saliency map is the highest. A first window of predefined size is positioned in the view so that its center is located on this most salient pixel. The saliency value SM1 associated to the first window and the saliency value $SM_{view}$ associated to the view are computed. If the ratio $$\Psi_0 = \frac{SM1}{SM_{view}}$$

is close to 1, i.e. higher than a threshold T (e.g. if $\Psi_0 \geq 0.8$), then the cropping window for the view is the first window. If $\Psi_0$ is not close to 1, i.e. lower than T, a second window of same size as first window is positioned in the view so that its center is located on the most salient pixel of the view located outside the first window. The saliency value SM2 associated to the second window is computed. If the ratio between $$\Psi_1 = \frac{SM_1 + SM_2}{SM_{view}}$$

is close to 1 then the cropping window for the view is the smaller window that comprises the first and the second windows. If the ratio $\Psi_1$ is not close to 1 then a third window is positioned in the view so that its center is located on the third most salient pixel of the view that is located outside the first two windows. The ratio between the sum of the three saliency values associated to the three windows and the saliency value $SM_{view}$ is compared to 1. If it is close to 1, then the cropping window for the view is the smaller window that comprises the three windows. If it is not close to 1 then the process of positioning new windows is repeated until the ratio between the sum of saliency values associated to each positioned window and $SM_{view}$ is close to 1. Thus, at each iteration k, a new window is positioned in the view so that its center is located on the most salient pixel (k) located outside the already positioned windows. The cropping window for the view is thus the smaller window that comprises all the positioned windows. Other methods may be used and the invention is not at all limited to this method for determining the position of cropping windows based on a saliency map.

At step 18, the left and right cropping windows are combined in a smoothed cropping window. During this step, the following constraint linked to 3D content is taken into account: no vertical disparity is allowed between left and right cropped views; the cropping windows of each view have the same height and the same vertical coordinates.

The CombineCroppingWindow step 18 takes the results for the 2D reframing applied on each view separately at steps 14 and 16 and combines mathematically the two cropping windows into a smoothed cropping window whose center coordinates are ($x_{smooth}$, $y_{smooth}$) and size (height and width) is ($h_{smooth}$, $w_{smooth}$). ($x_{left}$, $y_{left}$) are the center coordinates of the left cropping window and ($x_{right}$, $y_{right}$) are the center coordinates of the right cropping window. ($h_{left}$, $w_{left}$) are the height and width of the left cropping window and ($h_{right}$, $w_{right}$) are the height and width of the right cropping window.

$$y_{smooth} = \frac{y_{left} + y_{right}}{2} \quad x_{smooth} = \frac{x_{left} + x_{right}}{2}$$

$$h_{smooth} = \frac{h_{left} + h_{right}}{2} \text{ and } w_{smooth} = \frac{w_{left} + w_{right}}{2}.$$

According to a variant, the min and max value is taken as in equation 8. The same cropping window is applied on both views. Therefore, no vertical disparity exists between left and right crop views.

Another way for determining the smoothed cropping window is to determine which cropping window maximizes the saliency quantity available inside it.

The cropping window coordinates vary from the minimal x and y coordinates initially determined between the two views and the maximal x and y coordinates, such as described in the following equation:

$$(x1, y1, x2, y2) = \tag{2}$$

$$\operatorname{argmax}\left[\sum_{X=x1}^{x2} \sum_{Y=y1}^{y2} 0.5 * (SM_{left}(X, Y) + SM_{right}(X, Y))\right]$$

with $x1_{min} < x1 < x1_{max}$; $y1_{min} < y1 < y1_{max}$;

$x2_{min} < x2 < x2_{max}$; $y2_{min} < y2 < y2_{max}$ and $$\begin{cases} x1_{min} = \min(x1_{left}, x1_{right}); x1_{max} = \max(x1_{left}, x1_{right}) \\ x2_{min} = \min(x2_{left}, x2_{right}); x2_{max} = \max(x2_{left}, x2_{right}) \\ y1_{min} = \min(y1_{left}, y1_{right}); y1_{max} = \max(y1_{left}, y1_{right}) \\ y2_{min} = \min(y2_{left}, y2_{right}); y2_{max} = \max(y2_{left}, y2_{right}) \end{cases}$$

$SM_{left}(x,y)$ is the saliency value of pixel (x,y) in the left view and $SM_{right}(x,y)$ is the saliency value of pixel (x,y) in the left view. (x1,y1) are the coordinates of the top left pixel of the smooth cropping window and (x2, y2) are the coordinates of the bottom right pixel of the smooth cropping window. ($x1_{left}$, $y1_{left}$) are the coordinates of the top left pixel of the left cropping window and ($x2_{left}$, $y2_{left}$) are the coordinates of the bottom right pixel of the left cropping window. ($x1_{right}$, $y1_{right}$) are the coordinates of the top left pixel of the right cropping window and ($x2_{right}$, $y2_{left}$) are the coordinates of the bottom right pixel of the left cropping window.

At step 20, both left and right views are cropped into a left crop view and a right crop view by extracting in each view the part delimited by the smoothed cropping window.

The first embodiment is simple and fast to implement.

Figure 2:
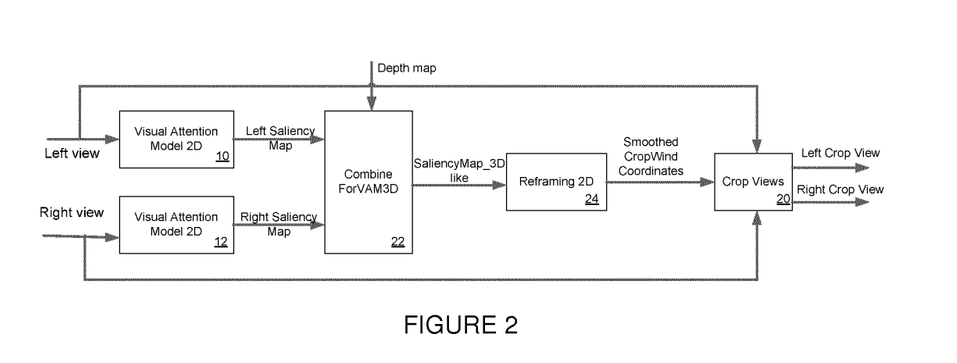
FIG. 2 depicts a flowchart of the method according to a second embodiment of the invention.

FIG. 2 represents the second embodiment. The steps identical to the steps of the first embodiment are identified on FIG. 2 with the same numerical references.

At step 10, a left saliency map is determined for the left view and at step 12 a right saliency map is determined for the right view.

At step 22, the two saliency maps coming from the visual attention model for each view are combined into a unique saliency map which describes a 3D saliency information but with a 2D representation of the saliency map. The CombineForVAM3D step 22 highlights the common areas present in the two saliency maps to create a unique 2D saliency map. During step 22, both saliency maps are merged into a unique saliency map (SaliencyMap_3Dlike) which is a 2D map highlighting some areas which are commonly salient in the two views. As an example, the saliency value $SM_{3Dlike}(x,y)$ for the pixel (x,y) in the SaliencyMap_3Dlike is defined as follows:

$$SM_{3Dlike}(x, y) = \alpha \cdot SM_{left}(x, y) + \beta \cdot SM_{right}(x, y) \quad (3)$$

$$\text{with} \begin{cases} \alpha = \frac{DM(x, y)}{255} \\ \beta = 1 - \alpha \end{cases}$$

where $SM_{left}(x,y)$ is the saliency value of the pixel (x,y) in the left saliency map, $SM_{right}(x,y)$ is the saliency value of the pixel (x,y) in the right saliency map and DM(x,y) is the depth value at location (x,y).

At step 24, a smoothed cropping window is determined based on the SaliencyMap_3Dlike. Step 24 is for example identical to step 14 or 16 but with the saliency map being the SaliencyMap_3Dlike.

At step 20, both left and right views are cropped into a left crop view and a right crop view by extracting in each view the part delimited by the smoothed cropping window.

Figure 3:
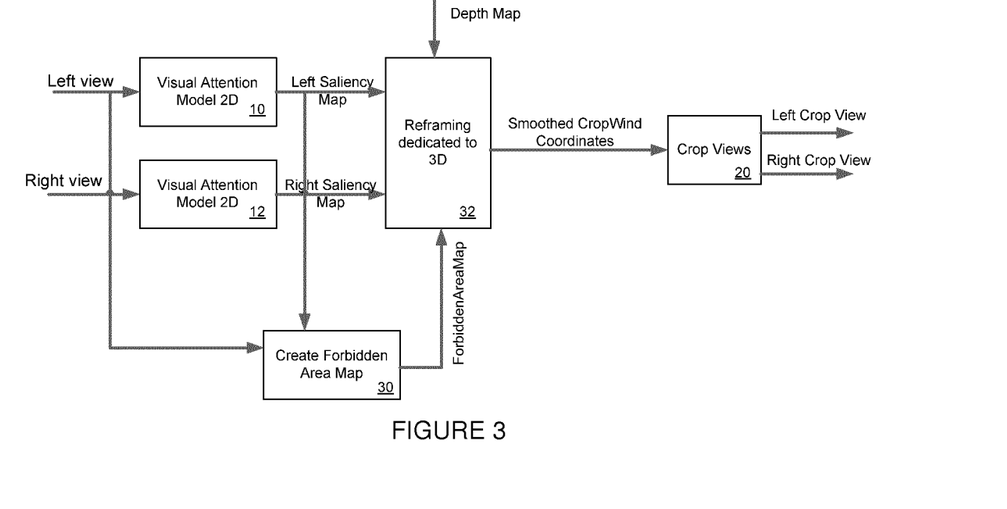
FIG. 3 depicts a flowchart of the method according to a third embodiment of the invention.

FIG. 3 represents the third embodiment. This embodiment is dedicated to 3D content. The decision about the cropping window extension uses possibly the depth map. 3 dimensional data are used to determine the smoothed cropping window.

The steps identical to the steps of the first embodiment are identified on FIG. 2 with the same numerical references.

At step 10, a first region of interest ROI1 is determined in the left view and at step 12 a second region of interest ROI2 is determined in the right view.

According to a variant, a left saliency map is determined for the left view and at step 12 a right saliency map is determined for the right view.

At step 30, referred to as CreateForbiddenAreaMap step provides a map to a Reframing3D step 32 which ensure the respect of some 3D constraints: no object on the border of the cropping window is allowed if this object is in front of the screen. Indeed, human brain cannot deal with that. The forbidden area map is created from one of the views either the left or the right. On FIGS. 3 and 4 the forbidden area map is created from the left view but the same can be made from the right view.

Figure 4:
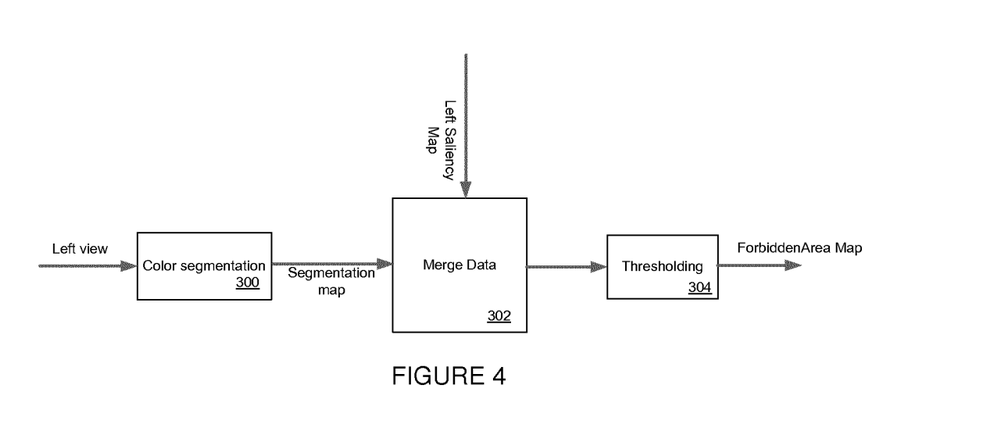
FIG. 4 represents a first detail of the flowchart depicted on FIG. 3.
Figure 5:
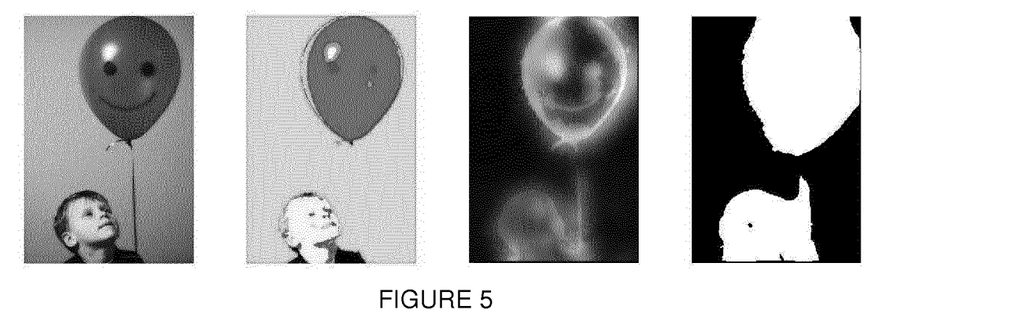
FIG. 5 represents from left to right, a picture, a segmentation map, a saliency map and a forbidden area map.

The step 30 is detailed on FIG. 4. It defines a forbidden area map where the cropping window cannot be located, such as on an object (white pixels of right image on FIG. 5).

At step 300, a color segmentation algorithm such as the one disclosed in J. van de Weijer et al "Learning Color Names for Real-World Applications" published in IEEE Transactions in Image Processing 2009 is used to get a segmentation map. Any other method providing a segmentation map can be used. The segmentation map is applied on one the views.

At step 302, a saliency value is computed for each color region identified in the segmentation map. As an example, the saliency values of the pixels belonging to a given region are averaged. The averaged value is considered as the saliency value of the region.

At step 304, the saliency values of the regions are thresholded. If the saliency quantity (or average of saliency) of a region is superior to a threshold T (Thresholding step) the final ForbiddenMap is set to 1 (or 255, white pixels) in this region. Such a black and white map with forbidden object is represented on FIG. 5. Following equation summarizes the computation of threshold T which is adaptive:

$$T_{R(\mu,\sigma)} = \mu_R - \sqrt{\sigma_R} \text{ if } \mu_R > 128 = \mu_R + \sqrt{\sigma_R} \text{ else} \quad (4)$$

where $\mu_R$ and $\sigma_R$ are respectively the average and the standard deviation of the region R. $\mu_R$ and $\sigma_R$ are computed from the saliency map associated with the view used for the segmentation.

At step 32, the smoothed cropping window is determined. This step 32 is detailed on FIG. 6.

Figure 6:
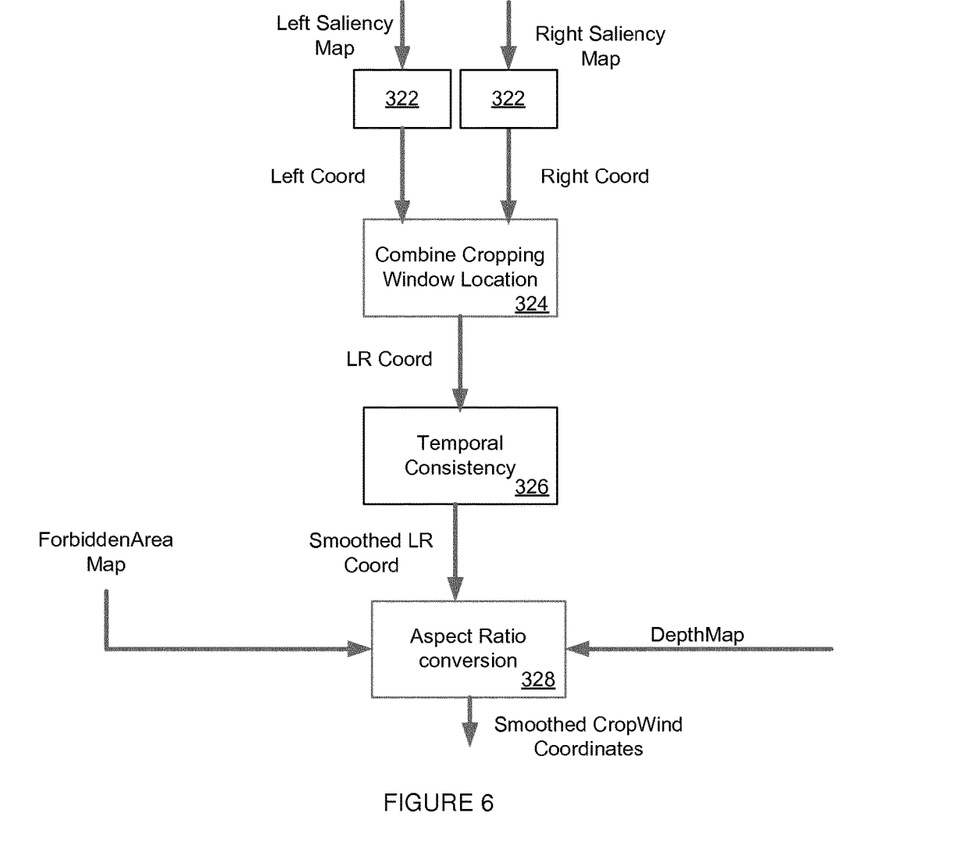
FIG. 6 represents another detail of the flowchart depicted on FIG. 3.

At step 322, a first cropping window is determined for each view independently. The goal of step 322 is to define, for each view, a cropping window that encloses either the regions of interest determined at steps 10 and 12 or the most conspicuous parts of the considered view S(x,y) of width W and height H from its saliency map SM(x,y). To this aim, the cropping windows are possibly the smallest windows that enclose the first and the second regions of interest.

Many 2D reframing methods may be applied. As an example, the saliency map is first binarized to identify the most salient areas. The pixels having a saliency value greater that a threshold are set to 255 in the binarized map. The smallest window that comprises all the identified salient areas, i.e. the white pixels, is the first cropping window.

According to a variant, a Winner-Take-All algorithm is purposely employed to select K areas $A_k$ with 1<k<K among the W×H candidates. This selection is composed of two steps. First, the view S(x,y) is scanned on a pixel-by-pixel basis and at each pixel position p(x,y) a feature vector $$V_p = \left\{ SM(p), d(p(x, y)), p\left(\frac{W}{2}, \frac{H}{2}\right) \right\}$$

is computed, such as the second feature is the euclidean distance of the current pixel to the center of the picture. The subset M with the K first pixels having the highest saliency value and the minimum distance to the center is computed, such as described by the equation 4. Secondly, when the $k_{th}$ candidate $C_k$ is located and memorized, its neighbors, that means the pixels included in $A_k$ are inhibited in order to determine the $(k+1)_{th}$ candidate $C_{k+1}$. $A_k$ is the set of pixels in a circle having a radius equal to 1 degree of visual angle. The size of the neighborhood depends on the viewing distance. The further the viewing distance is, the higher the size of the neighborhood is.

$$M = \{C_1 \ldots C_K\} = \begin{cases} \text{Max}(SM(p_k)) \\ \text{Min}\left(d(p_k(x,y)), p\left(\frac{W}{2}, \frac{H}{2}\right)\right) \end{cases} \quad (5)$$

A saliency map may have many pixels at the maximum value; therefore the pixels closer to the center of the picture are favored. The bias of scene center has an important role: observers tend to fixate near the center of scenes, even if the salience is null.

Figure 7:
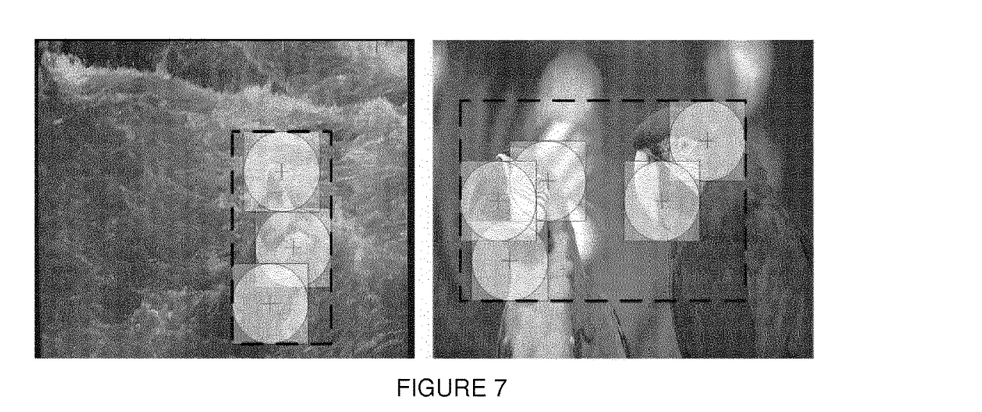
FIG. 7 illustrates the winner-take all algorithm.

Concerning the iteration number (or in other words the number K), it is important to underline the influence of this parameter on the size of the cropping window. If the iteration number is weak (or in other words, the number K of location is weak), it is likely that the size of the cropping window will be small. On the contrary, a high number of iteration will likely ensure a larger bounding box. Although this approach seems to be convenient, one aspect is clearly neglected: the distribution of salience in the saliency map. This aspect is illustrated with FIG. 7 which represents two different images. Indeed, the distribution of the salience (or the average observer variability) is likely to be sparse on a picture of a landscape. In other words, the separation between the salience of the peaks and the average background level is important. Concerning an image of landscape, in which nothing clearly pops-out, the distribution of salience is more uniform. In this case, selecting the K first locations can yield an erroneous result. To solve this problem, the iteration is monitored by the amount of salience enclosed by the bounding box. Therefore, K is constrained by the saliency quantity SQ contained by the previous areas $A_1 \ldots k$. While the relation (3) is not verified, the iteration process continues. K is adjusted in order to have P percent of the saliency in the cropping window, such as:

$$\Sigma_{k=1}^{K} SQ_k \leq P \leq SQ_{Total} \quad (6)$$

with $SQ_{total} = \Sigma_{y=0}^{H-1} \Sigma_{x=0}^{W-1} SM(x,y)$ (7)

and $SQ_k = \Sigma_{p(x,y) \in A_k} SM(p(x,y))$ (8)

P is a maximal quantity applied to the total saliency quantity $SQ_{total}$ of the map, such as 0<P<1. An example of such cropping windows is illustrated on FIG. 7.

At step 324, the left and right cropping windows are combined into an intermediate cropping window of top left coordinates $(x_{LR}, y_{LR})$, of height $h_{LR}$ and of width $w_{HR}$. The combination of the left and right cropping windows is done by applying a max and min operators on each x and y component:

$$LR \text{ Coord } (x_{LR}, y_{LR}, w_{LR}, h_{LR}) = \begin{cases} \min(x_{left}, x_{right}) \\ \min(y_{left}, y_{right}) \\ \max(w_{left}, w_{right}) \\ \max(h_{left}, h_{right}) \end{cases} \quad (9)$$

Another solution is to apply the solution of equation (1) of the CombineCroppingWindow module.

At step 326, the parameters (position, size) of the cropping window are filtered over time. This step is referred to as temporal consistency. The temporal consistency acts both on the position and the size of the cropping window and comprises stabilization of intermediate cropping window coordinates/size over time. The time is identified by an index i. Temporal consistency comprises for example two sequential steps a kalman filtering and a non linear filtering.

The Kalman filter is first applied in order to better predict the trajectory of the current sample. The Kalman filter is featured by an appealing recursive nature. Rather than working on all of the previous data to provide an estimation (as a Wiener filter will do), the Kalman filter does not require the long-term previous data. The Kalman filter is a linear system in which the mean square error between the predicted output and the actual output is minimized. The Kalman filter takes into account the two inherent sources of inaccuracy within a system, process $W_i$ and measurement noise $V_i$, in order to minimize the prediction error. In the following equation, X, is a general name standing for the vector of coordinates $(x^i_{LR}, y^i_{LR})$ and for cropping window size $(w^i_{LR}, h^i_{LR})$. The Kalman filter is defined by the state (eq. 9) and the measurement equation (eq. 10):

$$X_i = A \cdot X_{i-1} + W_i \quad (10)$$

$$Z_i = H \cdot X_i + V_i \quad (11)$$

Where A is a constant transition matrix and H is also a constant measurement matrix.

$$A = \begin{bmatrix} 1 & 0 \\ 0 & 1 \end{bmatrix} \text{ and } H = \begin{bmatrix} 1 & 0 \\ 0 & 1 \end{bmatrix} \quad (12)$$

W and V (matrix 1×2) represent the process and the measurement noise, respectively. They are assumed to be independent, white and with normal probability. They are empirically set and the associated noise covariance matrix is given by R and Q. Kalman filtering is detailed in document from G. Welch and G. Bishop entitled "An introduction to the kalman filter," published in Course 8, SIGGRAPH 2001, 2001.

$$R = \begin{bmatrix} 50 & 10 \\ 10 & 50 \end{bmatrix} \text{ and } Q = \begin{bmatrix} 5 & 0 \\ 0 & 5 \end{bmatrix} \quad (13)$$

The determination of the process noise is quite difficult. In this study, the process noise covariance is constant. The higher the uncertainty is, the faster the filter converges. The cropping window will have the tendency to fast adapt to the new saliency changes. The filter has to converge moderately fast because it should consider to be close to camera motion. Median filtering is an improvement that makes it possible to avoid unlikely samples. The only use of a Kalman filter is not sufficient to obtain a realistic effect. A non linear filtering is applied to remove short increase or decrease of the trajectory (horizontally or/and vertically) which may be disturbing. The long trajectory over frames is favoured to simulate natural camera motion. Each filtering is independently applied on the center coordinates and the size of the cropping window $CW_{LR}^i(x_{LR}, y_{LR}, w_{LR}, h_{LR})$. The result of this step is a cropping window $CW_{TC}^i (x_{TC}, y_{TC}, w_{TC}, h_{TC}) = (x_{smooth}, y_{smooth}, w_{smooth}, h_{smooth})$ with a smooth spatial trajectory and size.

At step 328, aspect ratio conversion is applied. The different variables and notations used are illustrated on FIG. 8. The cropping window is extended in one direction or another one or even in each direction in different proportion. The retargeting is cubical because it is also based on the depth map. The motivation is to avoid border or strong disparity to be "cut" by the cropping window. An interesting solution is to include or reject totally some objects with the same disparity.

Figure 8:
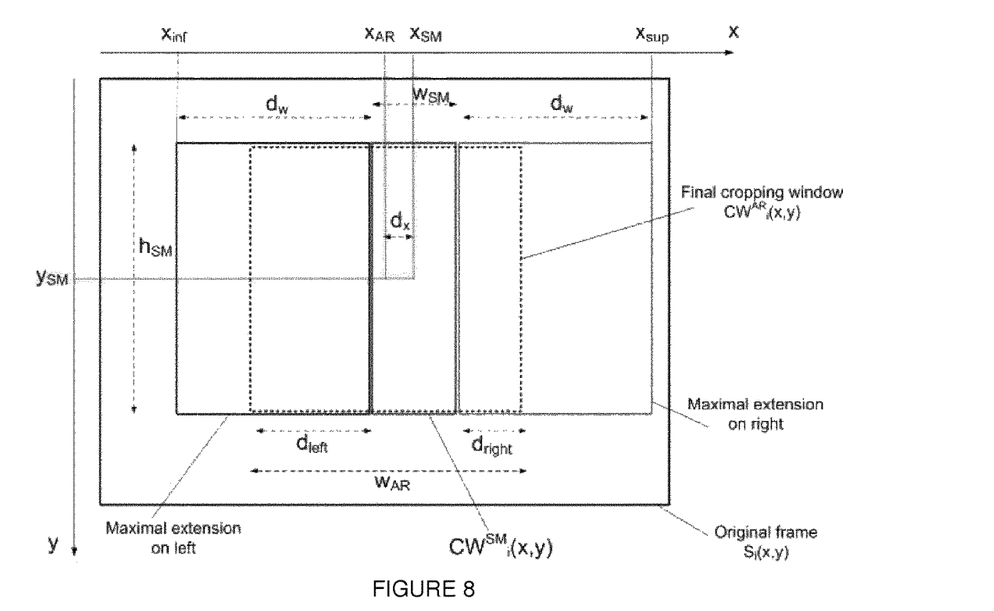
FIG. 8 represents cropping windows with their parameters.

There is no relation (no conjoint analysis) between the size of the intermediate window extracted from the saliency maps and the final aspect ratio defined by the user settings or application. Indeed, the step 322 performs an accurate estimation of the most important regions following the borders of saliency peaks Ak (as represented on FIG. 7) which are fully uncorrelated from the aspect ratio of a retargeting application. The anisotropic extension refines the cropping window size by extending the cropping window $CW_{SM}^i$ ($x_{SM}, y_{SM}, w_{SM}, h_{SM}$) in a direction depending on the current ratio $R_{SM}$. The extension is either on width or height to reach the targeted aspect ratio $R_{TG}$. Let us assume that:

$$R_{TG} = \frac{h_{AR}}{w_{AR}}$$

is the target aspect ratio $$R_{SM} = \frac{h_{SM}}{w_{SM}}$$

is the aspect ratio of the intermediate cropping window
If $R_{TG} > R_{SM}$, horizontal extension is performed (on the width of the current rectangle) else vertical extension is done (on the height of the current rectangle). Assuming a horizontal extension (respectively a vertical extension), one can define:

$$h_{AR} = h_{SM} \; (\text{resp.} \cdot w_{AR} = w_{SM}) \quad (14)$$

$$w_{AR} = w_{SM} + d_w \; (\text{resp.} \cdot h_{AR} = h_{SM} + d_h)$$

$$x_{AR} = x_{SM} + d_x \; (\text{resp.} \cdot x_{AR} = x_{SM})$$

$$y_{AR} = y_{SM} \; (\text{resp.} \cdot y_{AR} = y_{SM} + d_y)$$

where $$d_w = d_{left} + d_{right} = \frac{w_{AR}}{h_{AR}} \times h_{SM} - w_{SM} = R_{TG} \times h_{SM} - w_{SM}$$

$$d_x = x_{SM} + \frac{d_{right} - d_{left}}{2} \text{ and } w_{AR} = w_{SM} + d_{right} + d_{left}$$

Once the side of extension is defined, there are still several ways to extend the window. In other words, $d_{right}$ and $d_{left}$ may be computed in different manner. Let us assume that the width $w_{SM}$ has to be extended to reach the final aspect ratio. The depth map and/or the forbidden area map are used to extend the cropping window in one direction or another one. The depth map may be available or not depending on the use case. Consequently, two variants of aspect ratio conversion step 328 are disclosed one used when depth map is not available and one when the depth map is available.

When the depth map is not available, only the forbidden area map of step 30 is used. The sum of gradients (Global Gradient or GG) in the columns of pixels adjacent to the SmoothedLRCoord window are computed in order to characterize the quantity and representation of each extension side. The same may be applied horizontally. The optimal cropping window $CW(x_{opt}, y_{opt})$ is found when the following problem of minimization has a solution (assuming $y_{opt} = y_{SM}$):

$$x_{min} = \operatorname{argmin}_x(GG_x) \quad (15)$$

$$GG_{xmin} = \sum_{y=y_{SM}-\frac{h_{SM}}{2}}^{y_{SM}+\frac{h_{SM}}{2}} \vec{\nabla} FAM(x,y) = \sum_{y=y_{SM}-\frac{h_{SM}}{2}}^{y_{SM}+\frac{h_{SM}}{2}} \overrightarrow{\left(\frac{\partial FAM}{\partial x}, \frac{\partial FAM}{\partial y}\right)} =$$

$$\sum_{y=y_{SM}-\frac{h_{SM}}{2}}^{y_{SM}+\frac{h_{SM}}{2}} \sqrt{\left(\frac{dFAM}{dx}\right)^2 + \left(\frac{dFAM}{dy}\right)^2}$$

Indeed, a window (at the target aspect ratio) is determined by doing a horizontal translation under x axis in the interval $[x_{SM}-dw-w_{SM}/2; x_{SM}-w_{SM}/2]$ so that equation (14) is minimized. $d_w$ is the maximal extension width.

The corresponding $x_{min}$ is the left side of the optimal cropping window. Then, $$x_{opt} = x_{SM} + d_x \; (d_x \text{ defined in (13)})$$

$$d_{left} = x_{SM} - x_{min} - w_{SM}/2$$

$$d_{right} = d_w - d_{left}$$

According to a variant, $d_{right}$ is first determined by doing a horizontal translation under x axis in the interval $[x_{SM}+w_{SM}/2; x_{SM}+dw+w_{SM}/2]$ so that equation (14) is minimized.
When there is no solution to the minimization problem, the extension is done equally to each side, that means: $d_{left} = d_{right} = d_w/2$ When the depth map is available, a confidence $\text{Conf}_x$ on both maps is computed. This confidence is then maximized in order to find the best cropping window.

$$x_{min} = \operatorname{argmax}_x[\text{Conf}_x] \quad (16)$$

$$\text{With } \text{Conf}_x = \frac{\sum_{y=y_{SM}-\frac{h_{SM}}{2}}^{y_{SM}+\frac{h_{SM}}{2}} DM(x, y_{SM})}{\sum_{y=y_{SM}-\frac{h_{SM}}{2}}^{y_{SM}+\frac{h_{SM}}{2}} FAM(x, y_{SM})}$$

Indeed, a window (at the target aspect ratio) is determined by doing a horizontal translation under x axis in the interval $[x_{SM}-dw-w_{SM}/2; x_{SM}-w_{SM}/2]$ so that equation (15) is maximized. $d_w$ is the maximal extension width.

The corresponding $x_{min}$ is the left side of the optimal cropping window. Then, $$x_{opt} = x_{SM} + d_x \; (d_x \text{ defined in (13)})$$

$$d_{left} = x_{SM} - x_{min} - w_{SM}/2$$

$$d_{right} = d_w - d_{left}$$

According to a variant, $d_{right}$ is first determined by doing a horizontal translation under x axis in the interval $[x_{SM}+w_{SM}/2; x_{SM}+dw+w_{SM}/2]$ so that equation (15) is maximized.

At step 20, both left and right views are cropped into a left crop view and a right crop view by extracting in each view the part delimited by the smoothed cropping window.

Figure 9:
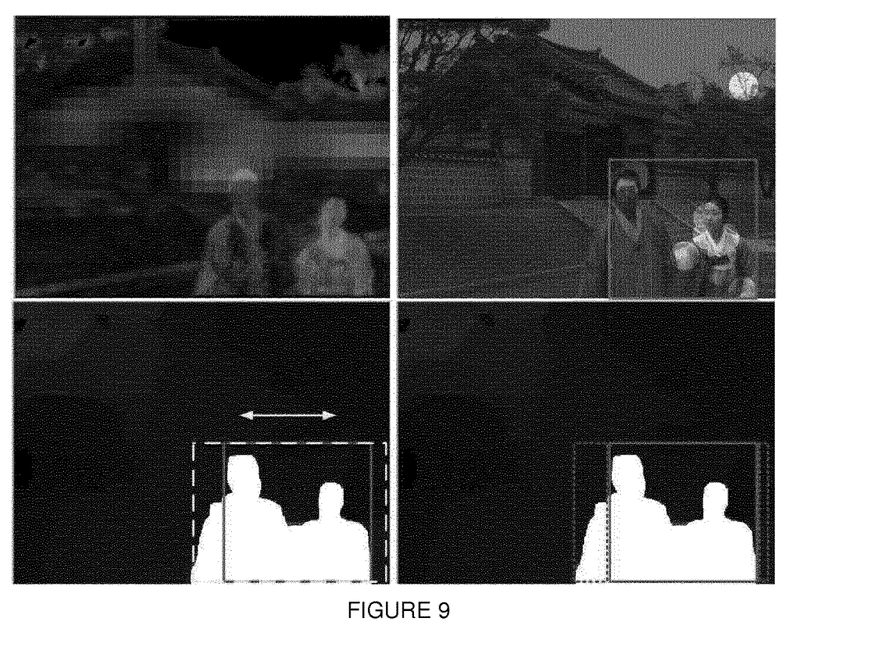
FIG. 9 represents a saliency map of a picture, a first cropping window onto the picture; a forbidden area map and a final cropping window.

FIG. 9 represents on the top left-hand side a saliency map, on the top right-hand side the first saliency peaks and the corresponding first cropping window (step 322). The bottom left-hand side image is the forbidden area map and the sliding window which has to minimize several quantities to be the final cropping window. The bottom right-hand side presents the final left and right chosen quantities to avoid cutting of objects. Indeed, the forbidden area map indicates regions (in white) where final cropping window borders is to be avoided The retargeting method according to the invention is fully automatic, ensures a good final quality without missing fundamental parts for the global understanding of the scene and improves the 3D effects and the immersive experience in comparison with the version with black stripes.

The invention may be advantageously for many post-production tasks such as:

Content preparation for aspect ratio conversion. A TV owner will appreciate to have its content reformatted for several supports such as internet, mobile TV, regular TV channels . . . in the case of catch-up TV and VOD.

Content preparation for blu-ray disk. An aspect ratio conversion from theater to TV aspect ratio is required in the preparation of the blu-ray support.

Figure 10:
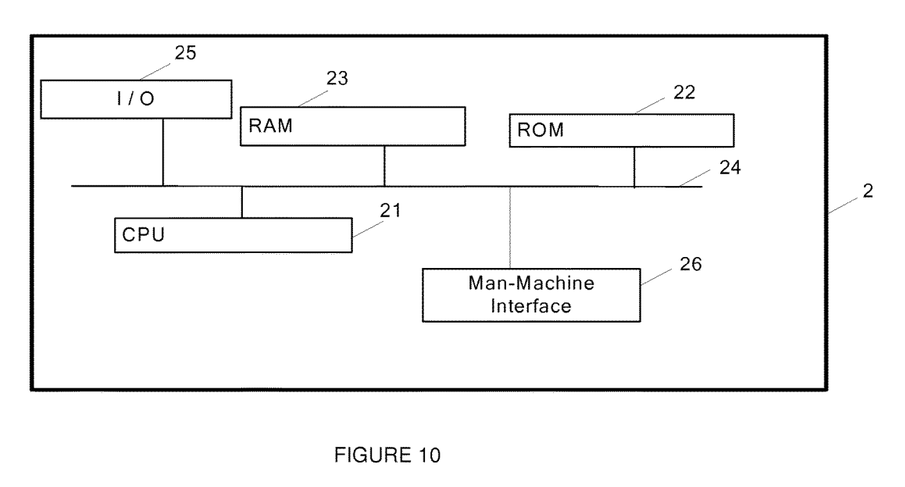
FIG. 10 diagrammatically illustrates a retargeting device 2 according to the invention.

FIG. 10 diagrammatically illustrates a retargeting device 2 according to the invention. Only the essential elements of the retargeting device 2 are shown in FIG. 10. The retargeting device 2 comprises, connected together by an address and data bus 24:

a processing unit 21 such as a microprocessor (or CPU),
a non-volatile memory of the ROM (Read Only Memory) type 22,
a Random Access Memory (RAM) 23,
an input and output interface 25, and
possibly a man-machine interface 26.

It is noted that the word "register" used in the description of memories 22 and 23 designates in each of the memories mentioned, a memory zone of low capacity (some binary data) as well as a memory zone of large capacity (enabling a whole programme to be stored or all or part of the data representing an audio/video service received).

The non-volatile memory 22 contains algorithms implementing the steps of the retargeting method according to the invention. When powered up, the processing unit 21 loads and runs the instructions of these algorithms. The random access memory 23 comprises notably operating programs of the processor unit 21 that are loaded at the powering up of the device, as well as the images to be processed i.e. to be retargeted. The function of the input/output interface 25 is to receive the input signal (i.e. the image or images to be reframed) and emit the image or images retargeted according to the steps 10 to 20 of the method according to the invention. The man-machine interface 26 of the retargeting device 2 enables the operator to interrupt the processing as soon as a retargeting error that is not compatible with requirements occurs. This interface can also enable the operator to manually identify using this interface cognitive information such as text zones and faces. The retargeted images are stored in the random access memory then possibly transferred to the read-only memory to be archived with a view to subsequent processing operations. The man-machine interface 26 possibly comprises a control panel, for example a keyboard and a display screen.

According to variants, the retargeting devices compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The invention claimed is:

1. Method for retargeting a 3D content comprising at least a first view and a second view the method comprising:
   determining a first saliency map from said first view and a second saliency map from said second view using a processor;
   determining a first cropping window from said first saliency map and a second cropping window from said second saliency map;
   combining said first and second cropping windows into a final cropping window identified with parameters determined from said first and second cropping windows;
   determining a forbidden area map indicating regions where final cropping borders are to be avoided;
   converting an aspect region of the final cropping window into a target aspect ratio using the forbidden area map; and
   cropping said first view and said second view according to said final cropping window, the cropped first and second views forming the retargeted 3D content.

2. Method according to claim 1, wherein the method further comprises filtering over time the parameters of the final cropping window.

3. Method according to claim 1, wherein the method further comprises:
   filtering over time the parameters of the final cropping window; determining a forbidden area map indicating regions where final cropping window borders are to be avoided; and
   converting the aspect ratio of the final cropping window into a target aspect ratio using the forbidden area map and a depth map.

4. Method according to claim 2, wherein the step of determining the forbidden area map comprises the steps of:
   segmenting one of said at least two views into a segmentation map of regions;
   computing, for each region of the segmentation map, a saliency value from the saliency map of said one of said at least two views;
   thresholding said saliency values computed for each region to form a forbidden area map.

5. Device for retargeting a 3D content comprising at least a first view and a second view the device comprising:
   means for determining a first saliency map from said first view and a second saliency map from said second view;
   means for determining a first cropping window from said first saliency map and a second cropping window from said second saliency map;
   means for combining said first and second cropping windows into a final cropping window identified with parameters determined from said first and second cropping windows;
   means for determining a forbidden area map indicating regions where final cropping window borders are to be avoided;
   means for converting the aspect ratio of the final cropping window into a target aspect ratio using the forbidden area map; and
   means for cropping said first view and said second view according to said final cropping window, the cropped first and second views forming the retargeted 3D content.

6. Device according to claim 5, wherein the device further comprises means for filtering over time the parameters of the final cropping window.

7. Device according to claim 5, wherein the device further comprises:
   means for filtering over time the parameters of the final cropping window;
   means for determining a forbidden area map indicating regions where final cropping window borders are to be avoided; and
   means for converting the aspect ratio of the final cropping window into a target aspect ratio using the forbidden area map and a depth map.

8. Device according to claim 6, wherein the means for determining the forbidden area map comprises:
   means for segmenting one of said at least two views into a segmentation map of regions;
   means for computing, for each region of the segmentation map, a saliency value from the saliency map of said one of said at least two views;
   means for thresholding said saliency values computed for each region to form a forbidden area map.

9. A non-transitory program storage device, readable by a computer, tangibly embodying a program of instructions executable by the computer to perform a method comprising the steps of
   determining a first saliency map from said first view and a second saliency map from said second view;
   determining a first cropping window from said first saliency map and a second cropping window from said second saliency map;
   combining said first and second cropping windows into a final cropping window identified with parameters determined from said first and second cropping windows;
   determining a forbidden area map indicating regions where final cropping borders are to be avoided;
   converting an aspect region of the final cropping window into a target aspect ratio using the forbidden area map; and
   cropping said first view and said second view according to said final cropping window, the cropped first and second views forming the retargeted 3D content.

10. A device for retargeting a 3D content including at least a first view and a second view, comprising:
    a processor configured to determine a first saliency map from said first view and a second saliency map from said second view, to determine a first cropping window from said first saliency map and a second cropping window from said second saliency map, to combine said first and second cropping windows into a final cropping window identified with parameters determine from said first and second cropping windows, to determine a forbidden area map indicating regions where final cropping window borders are to be avoided, to convert the aspect ratio of the final cropping window into a target aspect ratio using the forbidden area map, and to crop said first view and said second view according to said final cropping window, the cropped first and second views forming the retargeted 3D content.

11. The device according to claim 10, wherein the processor is further configured to filter over time the parameters of the final cropping window.

12. The device according to claim 11, wherein the processor is further configured to segment one of said at least two views into a segmentation map of regions, to compute, for each region of the segmentation map, a saliency value from the saliency map of said one of said at least two views, and to threshold said saliency values computed for each region to form a forbidden area map.

13. The device according to claim 10, wherein the processor is further configured to filter over time the parameters of the final cropping window, to determine a forbidden area map indicating regions where final cropping window borders are to be avoided, and to convert the aspect ratio of the final cropping window into a target aspect ratio using the forbidden area map and a depth map.

* * * * *